April 18, 1939.　　L. G. MORSE ET AL　　2,155,144
REFRIGERATION SYSTEM
Filed March 12, 1937　　2 Sheets-Sheet 1
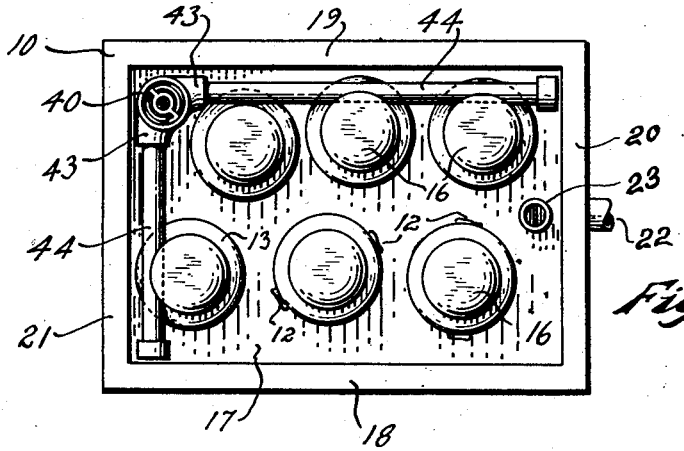
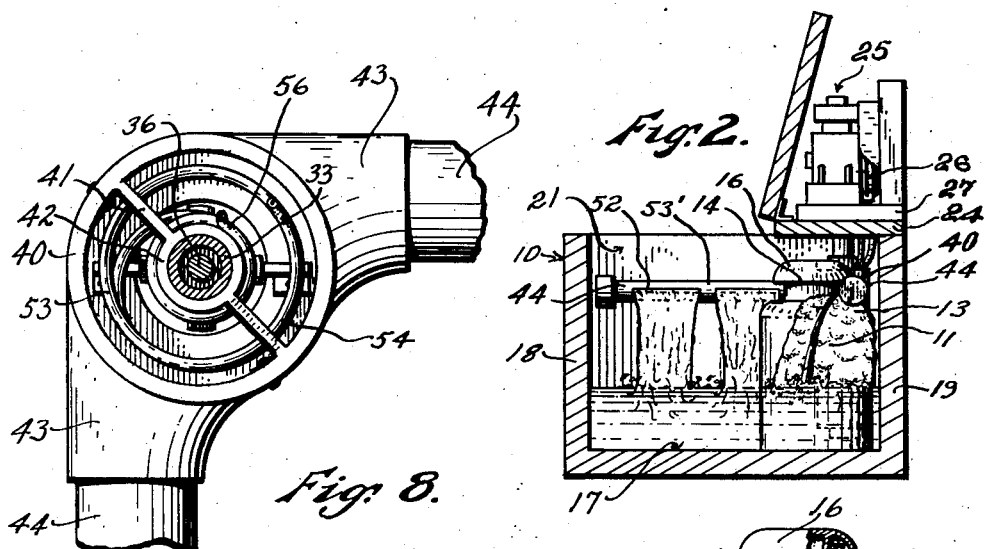
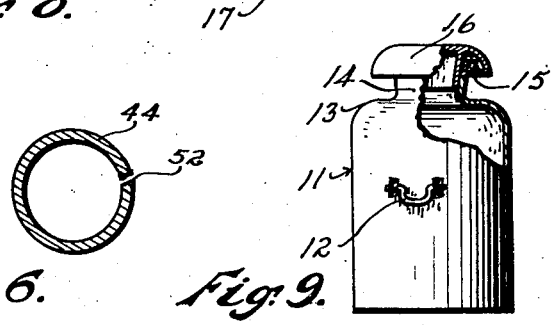
INVENTORS.
L. G. MORSE
B. B. D'EWART,
BY: Horace S Woodward
ATTORNEY April 18, 1939.  L. G. MORSE ET AL  2,155,144
REFRIGERATION SYSTEM
Filed March 12, 1937   2 Sheets-Sheet 2

INVENTORS.
L. G. MORSE,
B. B. D'EWART,
BY: Horace S. Woodward
ATTORNEY.

Patented Apr. 18, 1939

2,155,144

UNITED STATES PATENT OFFICE 2,155,144

REFRIGERATION SYSTEM

Leslie G. Morse, Randolph, Vt., and Benjamin B. D'Ewart, Worcester, Mass.

Application March 12, 1937, Serial No. 130,590

8 Claims. (Cl. 62—101)

The invention relates to refrigeration applied to cooling of milk on dairy farms, and has for an aim to enable highly effective chilling of milk in accordance with the well recognized principles of sanitation and hygiene while at the same time effecting a simplification of the structural and mechanical elements and features involved in attaining the desired results. In the matter of sanitation, etc., it is a purpose to present an embodiment of means which will enable more thorough cleaning of the cooling tank, as well as lessening the accumulation of bacterial or fungal matter in the tank. A most important aim is to provide means which will effect more rapid chilling of cans of milk fresh from the cow. A related aim is to enable such rapid chilling of newly introduced cans of milk in a tank without raising the temperature of the remainder of the tank content objectionably.

In relation to structural improvement, it has heretofore been recognized that in cooling tanks utilizing a body of cold water to chill the cans of milk and to keep such cans of milk cold until shipment, when a night's milking is contained in the tank and a morning's milking is then introduced, the newly introduced cans tend to raise the temperature of the whole body of water so that the earlier milking is not kept at the uniform temperature which would be desirable. Also, that the water will stratify and become warm at the top so that the newly introduced milk is not effectively cooled at the tops of the cans, and the earlier milking tends to become sufficiently warmed at the upper parts of the cans to increase the bacterial propagation to a dangerous rate, and certainly, to an objectional degree. Therefore, it has been a practice to partition the tanks and locate an evaporator unit (in which a liquefied refrigerant of low boiling point is evaporated) in one compartment, and regulate the flow between the two compartments so that the temperature of the other is not raised excessively, as well as a good convection action attained to prevent stratification, when cans are introduced thereinto.

It is therefore an important aim of our invention to accomplish the cooling of newly introduced cans of milk in a tank through rapid absorption of heat therefrom by water fresh chilled from the evaporator unit and to prevent communication of heat from such cans to the main body of water in the tank to an objectionable extent, while securing a good distribution of low temperature water uniformly throughout the tank; and all this with the use of the basically simple rectangular single-chamber tank (which is most economical form available ordinarily), using no partition or baffles, or guards.

In many prior devices for effective refrigeration, coils of small diameter pipe or tubing set in the water and in which coils the liquid refrigerant is allowed to boil, are used, and guards are usually necessary in the form of partitions or walls to prevent the milk cans from damaging the coils.

It is an aim of our invention to present a unit in which coils are not projected extensively in the tank, and yet ample distribution of lowest temperature water over a considerable area effected, without requiring elements liable to damage by the cans of milk. It is also an aim to present a unit which may be so designed that it will occupy a minimum of the usable space in the tank that might be occupied by milk cans or portions of such cans.

Another important object is to enable the accomplishment of circulation and localizing of low temperature water in the desired manner with apparatus of great simplicity, effectiveness, and low cost.

An object attained by the invention is the reduction of non-essential heat absorption, so as to minimize the work or amount of refrigeration required to be done for a given milk production.

In this direction, it is also an aim to enable the use of less than the amount of water necessary to enclose a can or two cans to the maximum depth usually desired, thereby permitting maintenance of a smaller body at the required refrigerating temperature, than is usually kept in tanks of corresponding milk capacity; yet assuring high efficiency in the cooling of milk in the usual cans as introduced into cooling tanks.

It is a purpose of the invention to present also novel features of construction in such unit, and in their combination and arrangement; and system of operation of the apparatus, as well as in the combination, arrangement and construction of parts constituting the cooling plant as a whole, as will appear from the following description and accompanying drawings setting forth and illustrating one of the preferred embodiments of our invention, wherein Figure 1 is a top plan view of a tank with the top and condenser unit removed, in which tank are represented the evaporator-circulator unit forming part of our invention, and milk cans, Figure 2 is a vertical cross sectional view of the tank, with one milk can therein.

Figure 6 is a cross section of one of the discharge pipes.

Figure 8 is a detail top view of the flume unit.

Figure 9 is a conventional showing of a standard milk can.

Figure 5:
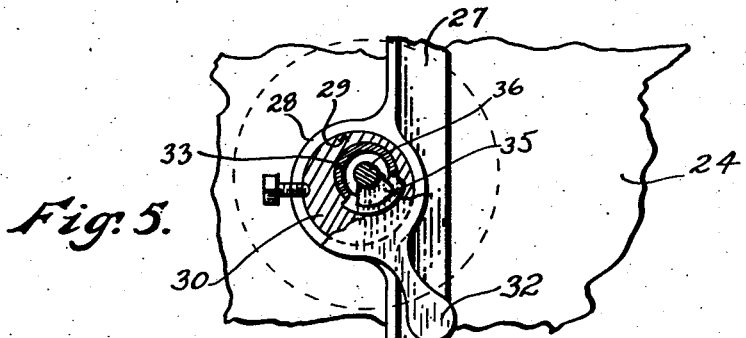
Figure 5 is a fragmentary enlarged horizontal section of the last named mounting and drive adjustment.

There is illustrated a "milk cooling tank" 10 of conventional wall and floor construction, which may be of the simplest rectangular form in a size and length adapted to the needs of a particular milk producer (the farmer, dairy-man, or other proprietor of the dairy, or other plant where milk is taken from the cows). A typical installation is one for a farm where three "ten-gallon cans" of milk are produced respectively in the morning and at the evening milking. The diameter and height and proportions of the various elements of such can is standardized throughout the country, and they are universally used by farmers and dairymen. Each can has a cylindrical body portion 11 with lifting handles 12 at opposite sides, a sloping shoulder 13, a neck 14 of greatly reduced diameter extending upwardly from the shoulder, and an upwardly curved lip 15. Each can has a cover 16 with a cylindrical flange to fit snugly within the neck and an eave portion overhanging and extending outwardly beyond the lip 15, but of a diameter less than that of the body of the tank. The cans are customarily filled by the producers to or near to the top of the body portion 11, with the milk to be cooled and shipped.

A tank 10 for such installation as mentioned, with liberal margin of clearance and for ready handling of cans may be of 54 inches long by 36 inches wide and 27 inches deep, inside measurements, and corresponding outside dimension would ordinarily be about 62 inches by 44 inches and 30 inches, respectively. The measurements inside may be much less where less space between the cans and between the walls and cans is provided. The tank so built consists of a bottom or floor 17, front wall 18, back wall 19, and right and left hand walls 20 and 21, all of these walls and bottom being insulated against heat transmission in any familiar way, and unbroken, except for a standard form of waste outlet 22, which may be let through one end wall, with a stand pipe 23 extending therefrom within the tank to regulate the overflow. No special construction or materials are required in the walls or bottom for use with our invention, other than the customary heat insulation as far as desired.

Customarily, tanks of this general kind have a rear fixed top portion 24 extending partly over the tank, and it is our practice to set upon this part a motor-condenser-collector unit 25, to form part of the refrigeration system of which the tank 10 forms a part. Such units are available on the market produced by several manufactureres, and comprise no part of our invention, except as to the coordination of the fly-wheel and pulley 26 of such unit in our organization, as will appear. We have selected a unit 25 in which the pulley 26 is located at the rear side and one end of the unit, so that it may be close to the corner of the space within the tank.

The unit 25 includes a base frame portion 27 set upon the tank top 24, and on this there is formed an enlargement 28 in which a circular bearing opening 29 is machined on a vertical axis, spaced a distance from the plane of the pulley 26 near the lower side of the pulley. Set revolubly in the opening 29 there is an eccentric or hanger block 30, enlarged at 31 over the frame and having an operating handle 32 projected therefrom over the frame portion 27 by which the block is rotated as necessary. The block 31 is bored on a vertical axis eccentric to that of the opening 29 and block, to receive and support a shaft tube 33 revolubly therein and dependent in the tank, the tank top 24 being also bored to form an opening around the tube as large or larger than the opening 29. The block 31 is peripherally grooved to receive the end of a set screw 34 engaged through the frame to hold the block in adjusted positions. A suitable ball bearing and dust guards 35 are set in the upper end of the tube, in which impeller shaft 36 is journalled, the lower end of the shaft being journalled in rubber or otherwise at the lower end of the tube, and projecting a short distance below the tube, where an impeller 37 is mounted on the shaft, as will be further described. On the upper end of the shaft a friction pulley 38 is fixed with its periphery bearing against the side of the rim portion of the pulley 26. For lubrication the bearing 35, the shaft is bored with an outlet to the bearing and a pressure lubrication fitting 39 provided thereon by which lubricant may be forced to the bearing. By reason of the eccentric mounting of the shaft in the block 31, rotation of the block is utilized to adjust the pulley 38 in proper engagement with the pulley 26, the screw 34 serving to hold the pulley in adjusted positions.

The tube 33 is utilized to suspend and support entirely a complete evaporator and circulation unit within the tank. This unit consists of an upper tubular cast head or throat fitting 40 of cylindrical form having an interior cross arm 41 and collar 42 secured to the tube 33. The throat fitting is formed with two horizontal outlet nipples 43 at right angles to each other, and offset toward the adjacent walls, in which nipples pipes 44 are engaged, one extending parallel to the back wall 19 and the other pipe extending parallel to the end wall 21 of the tank 10, a short distance above the normal water level of the tank when six cans are in place, and also above the level of the shoulder of a can set on the floor 17.

Figure 4:
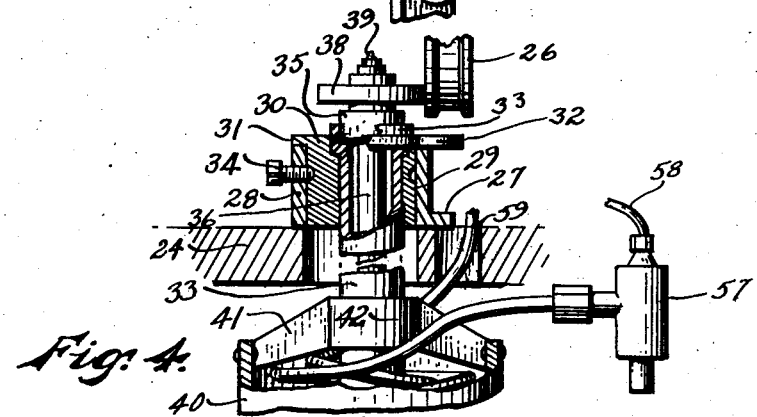
Figure 4 is a similar view of the suspension mounting of the evaporator-circulator unit and the drive for the impeller.
Figure 3:
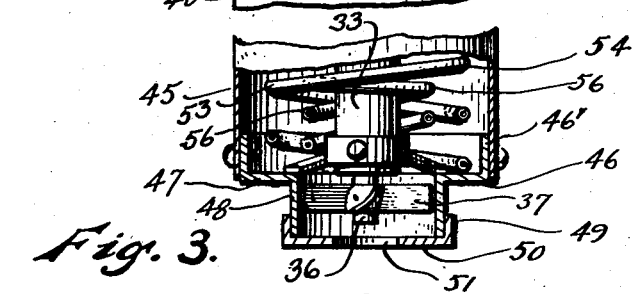
Figure 3 is a fragmentary enlarged vertical section at the intake of the evaporator-circulator unit.
Figure 7:
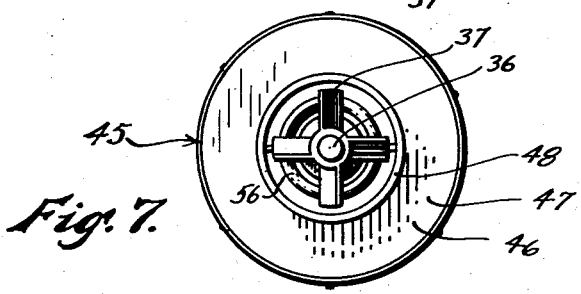
Figure 7 is a bottom view of the impeller.

The throat casting extends a distance higher (see Fig. 2), so as to establish a head of water therein at the nipples, as will be understood, but is open clear at the top (see Figs. 4 and 8), within the tank and stops below the tank top 24.

Secured to the lower rim of the throat fitting there is a cylindrical shell 45, which may be of sheet metal, and secured to the lower end of this shell there is a lower fitting 46 mounted on the tube 33. This fitting consists of an upper cylindrical flange 46' adapted to be secured in close fit to the shell 45 and having at the lower side a part of reduced diameter affording a horizontal shoulder 47, from which a short cylindrical case portion 48 extends longitudinally downward, receiving frictionally thereon a pressed metal or cast port ring 49 detachably engaged with the case portion and serving with the case portion as a housing or casing for the impeller 37. The ring 49 is formed with an annular flange 50 extending inwardly and serving to form a reduced intake opening or port 51 of a diameter smaller than the radius of the impeller. The impeller is in the form of a four-bladed screw propeller, but functions in a way distinct from the usual action of such devices, as will be explained. It is so proportioned in relation to the pulley and speed of the motor of the compressor unit that it will rotate at a rate in the neighborhood of seventeen hundred revolutions per minute, as at present embodied in a unit where the shell 45 is six inches in diameter and the pipes 44 somewhat more than two inches in diameter, the remaining construction illustrated being in the proportions shown.

Each pipe 44 has a single line of longitudinal port slots 52 extending nearly continuously throughout its length, located at or about the horizontal diameter of the pipes. Short joining portions 53' may be left at intervals interrupting the continuity of the slots to avoid weakening the pipe structure, although a continuous slot stopping short of the ends of the pipe is practicable. The port slots 52 have been made about one eighth of an inch wide in a vertical direction with a slight upward inclination from within toward their outer parts, although this is not essential. The sides of the slots may be parallel. These pipes are capped at their ends so that water may not flow through the ends. The pipes 44 are at the level of the neck 14 of a can set upon the floor of the tank, and will lie over the shoulders of cans placed closely thereadjacent.

The impeller has a radius of one and three quarter inches in a typical installation, its blades having a pitch substantially as shown and extending into close relation to the case portion 48, which thus is slightly more than three and one-half inches in diameter interiorly. The port 51 has been formed two and one half inches in diameter. These proportions may be varied to suit various conditions and may vary in some degree from those set forth in the particular representation herein without detriment.

Set upon the shoulder 47 there is an integral pair of helical coils 54 formed of a single piece of tubing bent to form the large outer coil 53 set within the top flange 46' spaced from the shell 45, and the inner coil 56 spaced within the first coil and spaced from the tube 33. Any suitable spacer 55 may be provided on the tube 33 within the small coil to properly center the latter around the tube and prevent loose movement of the coils within the shell. Other forms of coil may be used as discretion dictates. In the double coil an expansion valve 57 is connected to the upper end of the outer coil from which tubing 58 may lead from the collector of the compressor unit 25 while the suction line 59 is led from the upper end of the inner coil to the intake of the compressor of the unit 25. The valve 57 may be of any approved kind, of which suitable forms are now available upon the market.

In use, the tank is filled with water sufficient to rise to a level with the shoulders of a maximum number of cans set upon the floor of the tank. Such level will be six inches below the pipes 44 or may be higher. When there are fewer cans in the tank they are set close along one or both of the pipes 44. By reason of the form of the shell intake and impeller and the speed of the latter, the impeller is able to raise water through the shell when the water is at the low level, and discharge it through the pipes 44, so that it falls from the ports 51 in a sheet upon the shoulder of a can or cans set thereadjacent, and when the maximum number of cans is present the function is the same, although with somewhat increased volume of circulation, which will compensate for any additional heat required to be absorbed from the larger number of cans. Excess water wastes over the upper edges of the throat fitting 40.

In the event that the water is at a high level, an increased amount may spill from the top of the throat fitting, it being undesirable to close this, since there is no need for high pressures, and a minimum retardance of the impeller is thus insured at all times.

With a few cans in the tank the main water level therein is lower, but the cold water spilling over the cans will chill them rapidly, and maintain them at the desired low temperature. The fresh cold water striking first upon the shoulders of the cans will absorb heat most rapidly from the warmest parts of the milk in the cans, and by thermal currents within the milk as usual, any inequalities due to surfaces exposed beyond contact of the falling sheet of water will be compensated for. The water falling into the main body of water in the tank at water level will immediately set up a turbulence and convection currents therein preventing the development of a top stratum of water warmer than desired, and which will keep the cold water uniformly distributed throughout the horizontal area of the tank.

When a maximum number of cans is in the tank (of which a number may be newly introduced with fresh warm milk) the cold water freshly spilled from the ports 51 falls upon the shoulders of the cans as before, and sinks around the cans through the main body of water, forming in effect a continuously moving jacket of cold water, and by its turbulating effect, adjacent water in the main body is moved and chilled. Any warm portions momentarily formed at the top level of the main body of water are drawn into the vortex formed by the falling sheet so that such warmed portions are displaced by cold water and themselves quickly chilled. The location of the pipes 44 and arrangement of cans thereadjacent, assures the greatest turbulence and most rapid circulation immediately adjacent such cans, this circulation consisting principally of the newly discharged chilled water from the evaporator so that tendency of heat to be communicated from new warm cans to the water at other parts of the tank is minimized, in addition to rapid absorption of heat from newly introduced ones being assured.

After cans of fresh warm milk have remained for a sufficient time under the falling water sheets and new cans of warm milk are to be introduced, a sufficient number of the cooled cans are moved to a part of the tank distant from the pipes 44, to permit the new cans to be set in like positions under the pipes 44.

It will be seen that the pipes 33 are out of the way of the cans and will not ordinarily be in the path of the cans as the latter are introduced or shifted or removed. The shell 45 is disposed in a far corner of the tank where it will be subject to a minimum contact with cans, and furthermore, both the shell and the pipes 33 are of substantial material so that they are liable in a minimum degree to damage from contact with the cans.

These systems are usually operated continuously during milking periods, so that a lower temperature is maintained in the water passing the evaporator coils, and after the "milking" has been chilled the control or tank control may be permitted to stand at a somewhat higher setting or temperature. In this way the morning milk will be quickly chilled under the jets, and thereafter the compressor may operate intermittently. In the intervals, the tank being closed, there will be little if any absorption of heat by the cans from the air in the tank; but by conduction the unsubmerged portions of the cans will be kept cold. At the times of operation of the compressor, the cans, being under the jets will be chilled below the temperature of the bulk of water in the tank, and so, on the whole, the milk will always be at a good low temperature, not materially higher than the temperature of the average of the water in the tank.

Incident to rotation of the impeller in the construction described, when set in a body of liquid, the helicoid form of the blades will tend to propel water directly upward by impact at the incident angles involved. At the same time, however, as the head of water is built up, the lift by this action is increasingly opposed by the head of water, and there is developed a gradually increasing effect of centrifugal action by rotation of the liquid in the inlet passage or case portions 48. This, together with the reduced intake port 51 causes the liquid to move laterally outward over the shoulder 47 as well as upward by the longitudinal propulsive action of the helicoidal surfaces. With a water depth of eight inches before cans are introduced, the maximum lift required will not be more than about twelve inches, and the device has been found highly effective even for lifts as high as eighteen inches. When the tank is loaded with the one day's full production, the lift required will be not more than three or four inches. The overflow pipe 23 is extended to a height adjacent or above that of the shoulder of the can, so that the water level will not reach materially above the shoulder of a can at any time, and will be well below the lip 15 of the can always.

It is well known that the cream separates from the milk in the cans of warm new milk very rapidly, and an almost complete separation occurs before material chilling of the contents of a can even under the most favorable conditions in modern dairy farming. Therefore, bacterial growth tends to be more favored in this part of the milk, so that it becomes specially and peculiarly desirable to cool this part of the can promptly.

Our invention is therefore specially valuable in its function of preserving the cream from excessive bacterial propagation, and particularly such propagation due to delayed cooling of the cream or cream and milk mixture forming the upper portion of the normal can of newly milked milk introduced into cooling tanks on dairy farms.

It will be understood that heat conduction through cream is less effective than through milk from which the cream has been largely separated, so that the delayed cooling of the cream volume above the water level of tanks as heretofore practiced, is a serious factor in safe milk distribution. It is commonly necessary and at any rate a general practice to maintain the brine or water level much below the milk levels in the cans placed in cooling tanks on dairy farms, in order to minimize liability of upsetting cans, or for other reasons, and this adds materially to the liability of excessive bacterial count in such milk, as well as impairing more, the most valuable element of the milk, especially for creamery use. Our invention tends to reduce this liability to a minimum by removing the heat principally from the upper part of the cans initially, making it easier to attain a low count record, since the major propagation occurs while the milk is warm and it is easy to retard propagation after the milk is initially cooled, if it is kept in cans in a reasonable depth of chilled liquid.

We claim:—

1. Apparatus of the character described consisting of a tank chamber structure, a support thereover, a compressor thereon having a flywheel on a horizontal axis, a mount element revolubly mounted on a fixed vertical axis on said support spaced from the plane of said flywheel adjacent the lower part of the latter, means to secure the mount in adjusted positions of rotation, a vertical assembly tube fixed eccentrically through said mount, a shaft revoluble therein, a friction power transmission wheel fixed on the upper end of the shaft in peripheral contact with said fly-wheel, and an evaporator and liquid circulator unit mounted on the tube below said support, including an impeller on the lower part of said shaft.

2. An evaporator-circulator unit for tank structures consisting of a hanger support, a large tubular flume suspended therefrom open at top and bottom, a refrigeration means therein, means to propel liquid upwardly through the bottom of the flume to the top, and a lateral duct extended from the flume on a line whereby it may lie close beside the wall of a tank when the flume is set in the corner of a tank and having narrow discharge slots therein at a side throughout the major part of the length of said duct.

3. In refrigeration apparatus of the character described, a unit for lifting brine and the like above its normal level, and refrigerating the same, consisting of a vertical tubular shell member, a refrigerating coil therein, said shell being open at top and bottom and having a circular intake passage at the bottom having a cylindrical wall of materially less diameter than the shell, a rotary impeller mounted within said passage in the form of a screw propeller of small dimension longitudinally of its axis, a port member on the outer end of said passage having an inlet port therein of correspondingly smaller diameter than said passage, means to operate the impeller, said shell having lateral outlets above the normal level of liquid to be refrigerated.

4. A milk cooling system comprising a tank adapted to receive a plurality of milk cans of the character described, a vertical tubular flume element open at top and bottom and having a lateral duct located at a level immediately above the level of the shoulder of such a can when set on the floor of the tank, and having a longitudinal discharge slot therein whereby liquid may be ejected therefrom upon the upper side of a can set thereadjacent, a refrigerating element in the flume, and means to raise liquid through the flume from its lower end and discharge it through said duct and slot.

5. The structure of claim 4 in which the means to raise liquid consists of a vertical shaft mounted revolubly in the flume, an impeller thereon in the form of a helicoid propeller having such inclination as to produce a material centrifugal action in the liquid engaged, the said flume having a major part of large diameter above the impeller, a cylindrical part of reduced diameter around the impeller and a port member forming the inlet to the impeller at the bottom of the flume having a diameter materially smaller than the impeller for the purpose described, and operative connections for said shaft above the tank.

6. The structure of claim 4 in which said flume is a cylindrical member, and said duct is tangential thereto whereby it may lie close beside a tank wall for the purposes described.

7. A cooling device for the use described consisting of a tank structure having an interior bottom area adapted to receive a given number of erect containers and, up to a given high level in the tank adjacent the normal level of the content of said containers, having a capacity exceeding in volume in a predetermined degree the volume of the submerged portions of said containers when said given number are set in the tank, a body of liquid coolant in the tank equal in volume to the difference between the said volume of the submerged portions of all said containers and the volume of said capacity of the tank up to said high level, a circulating and refrigerating unit constructed to withdraw liquid from the tank below the level reached by the coolant when all the containers are withdrawn from the tank, and to cool and return the coolant, and having a discharge means constructed so that the discharge of coolant therefrom is confined to a portion only of the area that may be occupied by said containers and at a level above said normal level of content of the containers.

8. The structure of claim 7, in which the said discharge means is operative over an area which will include one-half of the said given number of containers when set within the tank.

LESLIE G. MORSE.
BENJAMIN B. D'EWART.